United States Patent [19]

Burlett et al.

[11] Patent Number: 5,268,134
[45] Date of Patent: Dec. 7, 1993

[54] TECHNIQUE FOR MANUFACTURING HOSE

[75] Inventors: Donald J. Burlett, Wadsworth; Kevin J. Pyle, Uniontown; Mark S. Sinsky, Akron; Ricahrd G. Bauer, Kent; Deborah A. Tung, Tallmadge; Vetkav R. Parameswaran, Hudson, all of Ohio

[73] Assignee: The Goodyear Tire & Rubber Company, Akron, Ohio

[21] Appl. No.: 898,598

[22] Filed: Jun. 15, 1992

[51] Int. Cl.⁵ ............................................. B29C 47/88
[52] U.S. Cl. ................................. 264/209.6; 264/150; 264/236; 264/328.2; 264/331.13; 264/347; 525/178; 525/184
[58] Field of Search ...................... 264/209.6, 236, 347, 264/150, 328.2, 331.13; 525/184, 178, 179

[56] References Cited

U.S. PATENT DOCUMENTS

| | | | |
|---|---|---|---|
| 3,701,702 | 10/1972 | Shichman et al. | 264/236 |
| 3,965,055 | 6/1976 | Shichman et al. | 264/236 |
| 3,972,757 | 8/1976 | Derderian et al. | 264/347 |
| 4,005,054 | 1/1977 | Bonnefon et al. | 264/210.6 |
| 4,017,557 | 4/1977 | Hammer et al. | 260/857 G |
| 4,136,149 | 1/1979 | Payne | 264/236 |
| 4,244,861 | 1/1981 | Spenadel et al. | 264/328.2 |
| 4,803,020 | 2/1989 | Valaitis et al. | 264/236 |
| 4,937,290 | 6/1990 | Bauer et al. | 525/184 |
| 4,992,513 | 2/1991 | Bauer et al. | 525/184 |
| 4,996,262 | 2/1991 | Pyke et al. | 525/177 |
| 4,996,263 | 2/1991 | Pyke et al. | 525/178 |
| 5,102,489 | 4/1992 | Grosse-Puppendahl et al. | 264/236 |
| 5,122,569 | 6/1992 | Scheibelhoffer et al. | 525/179 |

FOREIGN PATENT DOCUMENTS

| | | | |
|---|---|---|---|
| 47-27797 | 7/1972 | Japan | 264/328.2 |
| 55-62940 | 5/1980 | Japan | 264/331.13 |
| 866479 | 1/1958 | United Kingdom | |
| 1190049 | 9/1967 | United Kingdom | |

Primary Examiner—Jeffrey Thurlow
Attorney, Agent, or Firm—Alvin T. Rockhill

[57] ABSTRACT

Hoses are often reinforced with fabric to improve their performance characteristics, such as burst strength. By utilizing the technique of this invention, hose which has a high level of burst strength can be manufactured without including continuous yarn reinforcement. This invention specifically reveals a process for manufacturing a hose which involves the steps of (1) extruding a rubber composition into the form of a tube, wherein the rubber composition contains (a) an EPDM alloy comprised of (i) standard EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; (2) shaping the tube into the geometric form desired for the hose; and (3) curing the rubber composition at a temperature within the range of 130° C. to 210° C. to produce the hose.

22 Claims, No Drawings

TECHNIQUE FOR MANUFACTURING HOSE

BACKGROUND OF THE INVENTION

Hoses are often reinforced with continuous yarn to improve physical performance characteristics, such as burst strength. For example, radiator hoses for automobiles and trucks are generally reinforced with continuous yarn reinforcing elements. Continuous yarn reinforcements are typically used to improve the burst strength of such hoses. Even though building such fiber reinforced hoses is a labor intensive operation which results in a substantial amount of material waste, such techniques have been required to meet the demands of the automotive industry.

Building fiber reinforcements into hoses is a labor intensive operation. After such hoses are built, they are typically trimmed to the exact size required. The fiber reinforcement containing material trimmed from such hoses generally has to be scrapped since it is not typically possible to recycle such fabric containing material.

Hoses have been made by extruding rubber compositions into the form of a tube which is subsequently shaped into the desired form and cured. Such techniques are advantageous in that they reduce labor costs, in process inventory and waste. However, hose made utilizing such extrusion techniques have typically not had the physical strength demanded by the automotive industry for radiator hose. More specifically, such hoses have had low burst strength.

SUMMARY OF THE INVENTION

By utilizing the technique of this invention, hose which exhibits a high level of burst strength can be manufactured without the need for fabric reinforcement. This technique results in reduced labor cost, in process inventory and waste. Its use also reduces the number of manufacturing steps required and the need for certain machinery. Hoses having adequate burst strength can be made utilizing this technique at a much lower cost than equivalent hoses made with fabric reinforcements.

This invention specifically relates to a process for manufacturing a hose which comprises (1) extruding a rubber composition into the form of a tube, wherein the rubber composition is comprised of (a) an EPDM alloy comprised of (i) functionalized EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; (2) shaping the tube into the geometric form desired for the hose; and (3) curing the rubber composition at a temperature within the range of 130° C. to 210° C. to produce the hose.

The subject invention also discloses a process for manufacturing a hose which comprises injection molding a rubber composition into the desired geometric form for the hose at a temperature which is within the range of 130° C. to 210° C., wherein the rubber composition is comprised of (a) an EPDM alloy comprised of (i) functionalized EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; and (2) curing the rubber composition at a temperature within the range of 130° C. to 210° C. to produce the hose.

DETAILED DESCRIPTION OF THE INVENTION

The first step in the process of this invention involves extruding a special rubber composition into the form of a tube. This can be done continuously by extruding the rubber composition through an annular die. Generally, an annular flow channel is formed by the outer body of the die and a die mandrel. A wide variety of annular die designs can be utilized. For instance, the mandrel can be supported mechanically onto the outer die body by "spider legs". The disadvantage of utilizing such die designs which include spider legs is that they produce "weld lines" and streaks which are caused by the presence of the spider legs which split the flow of polymer. The weld lines caused by die designs including spider legs are undesirable because they represent points of mechanical weakness in the hose.

It is preferred to use dies wherein the mandrel is mechanically attached to the die body in such a way that obstacles are not presented to the flow of the annular region. The use of such dies eliminates weld lines and the problems associated therewith. Cross-head type dies can be used in such applications. For instance, a side-fed manifold die can be used for extruding the rubber composition into the form of a tube which is later shaped into the desired form of the hose and subsequently cured. The use of such side-fed manifold dies results in the flow of polymer being split at the inlet to the manifold and recombined 180° from the inlet. Due to this design, the polymer flowing around the mandrel has a lower distance to travel than the polymer which does not have to flow all the way around the mandrel. Accordingly, such side-fed manifold dies should be designed in a manner whereby the mandrel is placed eccentrically in the die allowing for a wider gap at the remote end from the lead port to provide a uniform flow rate. Such side-fed manifold dies can be designed in a manner whereby there is an essentially uniform flow rate, but the shear rate and temperature histories of the polymer being extruded will remain nonuniform.

Spiral mandrel dies are highly preferred because they allow for a virtually uniform flow rate, shear rate and temperature history. The use of such spiral mandrel dies also, of course, eliminates the problem of weld lines. The spiral mandrel die distributes the flow of rubber composition into separate feed ports or flow tubes. Each of these ports feeds the rubber composition in a spiral groove cut into the mandrel. The spiral decreases in cross-sectional area, whereas the gap between the mandrel and the die increases toward the exit. This results in a mixing or "layering" of polymer from the various feed ports. The utilization of such spiral mandrel dies results in a very uniform tube and their utilization in practicing this invention is highly preferred. Excellent results can also be attained by utilizing a Monsanto Expanding Pin and Die.

The rubber composition which is extruded or injection molded is comprised of (a) an EPDM alloy comprised of (i) functionalized EPDM rubber, (ii) an EPDM rubber having thermoplastic side chains grafted thereto, and (iii) dispersed thermoplastic, wherein the thermoplastic is selected from the group consisting of nylon, polyesters, and polyphenylene oxides, (b) an EPDM rubber, (c) carbon black, (d) at least one curative, (e) zinc oxide, (f) a processing oil, and (g) stearic acid. The total amount of thermoplastic in the EPDM alloy will be within the range of from about 2 phr to about 25 phr (parts per hundred parts of rubber). This is the total amount of thermoplastic in the EPDM rubber having thermoplastic side chains grafted thereto and the dispersed thermoplastic in the EPDM alloy. It is normally preferred for the amount of thermoplastic in the composition to be within the range of about 3 phr to about 20 phr. It is more preferred for the amount of thermoplastic in the rubber composition to be within the range of about 4 phr to about 12 phr, due to process considerations.

The EPDM rubber having thermoplastic side chains grafted thereto can be prepared utilizing the technique disclosed by U.S. Pat. No. 4,996,263 or U.S. Pat. No. 4,996,262, the teachings of which are incorporated herein by reference in their entirety. This technique involves reacting nylon with a functionalized rubber (maleated rubber) to produce rubber having nylon sidechains grafted thereto. As another example, the functionalized rubber can also be a carboxylated or sulfonated EPDM. Such procedures result in the formation of alloys (blends) which contain (i) functionalized EPDM rubber (which did not react), (ii) EPDM rubber having thermoplastic side chains grafted thereto, and (iii) dispersed thermoplastic (which did not react).

In the preparation of such alloys, the thermoplastic is normally molten during the period which it is mixed with the EPDM rubber. The morphology of the dispersed thermoplastic phase depends upon a variety of factors. Among these factors is the relative ratio of the viscosities of the two phases being mixed. Experience has shown that the domain size of the dispersed phase is smaller when the viscosities of the two phases' are closely matched. One means of "matching" these viscosities after the thermoplastic material has melted is to reduce the viscosity of the elastomer phase by increasing the temperature of mixing to further soften the elastomer. However, this approach is not always viable and the temperature control needed to accomplish this objective is very sensitive.

The viscosities of the two phases can also be "matched" by adding an extending oil to the alloy during mixing to reduce the viscosity of the elastomer. This brings the viscosities of the two phases closer together and results in there being a better dispersion of the thermoplastic. This oil extension approach eliminates or reduces the need to raise the mixing temperature to match the viscosities of the two phases. This saves the EPDM from undesirable degradation which can occur at higher temperatures. Another benefit realized by using this approach is that much higher concentrations of the thermoplastic can be employed in the alloy without a detrimental effect on processing.

The oil extension process can be accomplished during alloy formation or the elastomer can be oil-extended prior to mixing. The only drawback to prior oil extension is that the soft nature of the elastomer will retard heat buildup during mixing and complicate processing. There may be limitations of this process from the nature of the extending oil and the two polymer phases. For example, the extending oil should extend the elastomer and not alter the thermoplastic. Also, the extending oil should be easily taken up by the base elastomer and should not be volatile relative to the alloying temperature.

Virtually any type of nylon can be utilized as the thermoplastic in preparing the rubber compositions of this invention. These nylons are polyamides which can be prepared by reacting diamines with dicarboxylic acids. The diamines and dicarboxylic acids which are utilized in preparing such nylons will generally contain from about 3 to about 12 carbon atoms. Nylons can also be prepared by addition polymerization. Nylon which is prepared by reacting hexamethylene diamine with adipic acid (hexanedioic acid) can be utilized in the process of this invention. It is generally referred to as nylon-6,6 because it is derived from a diamine which contains 6 carbon atoms and a dicarboxylic acid which contains 6 carbon atoms. Nylon-6,6 typically has a number average molecular weight of 12,000 to 20,000, is exceptionally strong, abrasion resistant, and available from a wide variety of sources.

Polycapryllactam, which is generally referred to as nylon-8, is generally prepared by polymerization capryllactam. This polymerization takes place readily in the melt with a small amount of amino acid initiator. Capryllactam is prepared by dimerization of butadiene to cyclooctadiene, which is hydrogenated to cyclooctane, oxidized to cyclooctanone, converted to the oxime with hydroxylamine, and subjected to the Beckmann rearrangement. Nylon-8 has a melting point of 200° C.

Poly ($\omega$-aminoundecanoic acid), known as nylon-11, can be prepared by the melt polymerization of $\omega$-aminoundecanoic acid under an inert gas atmosphere at a temperature of about 215° C. Nylon-11has a melting point of 190° C.

Nylon-12 or poly($\omega$-dodecanolactam) is normally prepared by the polymerization of $\omega$-dodecanolactam at a high temperature of at least about 300° C. utilizing an acid catalyst. $\omega$-dodecanolactam is prepared by trimerization of butadiene to cyclododecatriene, the subsequent hydrogenation to cyclododecane, followed by oxidation to cyclododecanone, which is converted to the oxime with hydroxylamine, with the oxime being rearranged by Beckmann rearrangement to yield the $\omega$-dodecanolactam. Nylon-12 has a melting point of 179° C.

Nylon-6 or poly($\epsilon$-caprolactam) is normally prepared by the polymerization of $\epsilon$-caprolactam at 250°–270° C. in the presence of water and an initiator such as nylon-6,6 salt or aminocaproic acid. Polymerization to ~90% completion can be obtained. Monomer and higher oligomers can be extracted with hot water and the polymer then dried. $\epsilon$-caprolactam is usually prepared by conversion of cyclohexanone to the oxime with hydroxylamine, the oxime being rearranged by Beckmann rearrangement to yield $\epsilon$-caprolactam. Nylon-6 has a melting point of 223° C.

The nylons used in the process of this invention will typically have a number average molecular weight which is within the range of about 8,000 to about 40,000. Such nylons will more typically have number average molecular weights which are within the range of about 10,000 to about 25,000. The nylon utilized can be capped or can have free primary amine end groups. However, nylons having free amine end groups are believed to react more quickly with maleic anhydride and are accordingly preferred.

The nylons which are preferred for utilization in the process of this invention have melting points which are within the range of about 150° C. to about 295° C. Some representative examples of such preferred nylons include nylon-4, nylon-6, nylon-7, nylon-8, nylon-9, nylon-10, nylon-11, nylon-12, nylon-4,6, nylon-6,6, nylon-6,8, nylon-6,9, nylon 6,10,-nylon-6,12, and copolymers thereof.

The polyesters which can be used as the thermoplastic material will generally have a melting point of less than about 240° C. In most cases it is preferable for the polyester to have a melting point of less than about 200° C. The polyester utilized to modify the rubber will typically be a polyester elastomer. Virtually any type of polyester elastomer having a melting point of less than about 240° C. can be used. Such polyester elastomers are widely available commercially.

For instance, E. I. du Pont de Nemours & Company sells suitable polyester elastomers under the trademark Hytrel TM. Dupont Hytrel TM 5555 has been determined to be highly suitable for use as a polyester elastomer in the high modulus rubber compositions of this invention.

The polyester elastomers used in the alloys of this invention will normally contain both polyether and polyester segments. For example, such a polyester elastomer is comprised of the reaction product of (a) terephthalic acid or a dialkyl ester thereof, (b) a dimer acid, (c) a poly(tetramethylene oxide) glycol and (d) 1,4-butane diol. Polyester elastomers of this general type are described in greater detail in U.S. Pat. No. 4,254,001, which is hereby incorporated herein by reference in its entirety. Similar polyester elastomers which additionally contain chain branching agents and ionic compounds are described in U.S. Pat. No. 4,383,106 and U.S. Pat. No. 4,390,687. U.S. Pat. Nos. 2,623,031, 3,023,192, 3,651,014, 3,763,109, 3,766,146, 3,896,078, 4,013,624 and 4,264,761, all of which are incorporated herein by reference in their entirety, also describe polyester elastomers and techniques that can be utilized in their preparation.

The poly(phenylene oxide) which can be used as the thermoplastic material will generally be of the structural formula:

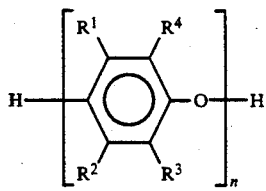

wherein $R^1$, $R^2$, $R^3$ and $R^4$ can be the same or different and represent alkyl groups containing from 1 to about 8 carbon atoms or hydrogen atoms and wherein n is an integer from about 100 to about 1000. Preferably, n is an integer from about 150 to about 550. Thus, the poly(phenylene oxide) will normally have a number average molecular weight which is within the range of about 15,000 to about 50,000. It is preferred for $R^3$ and $R^4$ to represent methyl groups and for $R^1$ and $R^2$ to represent hydrogen atoms (for the poly(phenylene oxide) to be poly-2,6-dimethyl-1,4-phenylene oxide. Poly(phenylene oxide) normally has a melting point of about 265° C. and a glass transition temperature of 205° C. It is normally desirable to add a plasticizer, such as polystyrene or a styrene copolymer resin, to reduce the melting point to less than about 240° C. Poly(phenylene oxide) resins which can be used in making the alloys for use in the hoses of this invention are sold by General Electric under the tradename Noryl. Poly(phenylene oxide) resins containing high impact polystyrene can also be utilized, such resins are also sold under the tradename Noryl. They are made by oxidative coupling of phenolic monomers.

In preparing the rubber composition, it is generally preferred to first prepare a nonproductive blend. Such nonproductive blends contain polymeric components of the rubber composition and certain other compounding ingredients but do not include the curatives. The rubber composition will normally contain from about 80 phr to about 150 phr of carbon black. Typically at least about 80 phr of carbon black is required to provide the level of stiffness desired. On the other hand, the utilization of more than about 150 phr of carbon black leads to compositions which are very difficult to process and extrude. It is normally preferred for the rubber composition to contain from about 100 phr to about 130 phr of carbon black. It is most preferred for the carbon black to be present in the rubber composition at a level which is within the range of about 110 phr to about 125 phr.

It is important to include a processing oil (an extending oil) in the rubber composition at a level which is within the range of about 20 phr to about 90 phr. It is preferred for the processing oil to be present in an amount ranging from about 30 phr to about 70 phr. It is most preferred for the processing oil to be present in the rubber composition at a level which is within the range of about 40 phr to about 50 phr. Zinc oxide is also included in the rubber composition at a level within the range of about 1 phr to about 10 phr. It is normally preferred for zinc oxide to be present in the rubber composition in an amount which is within the range of about 3 phr to about 8 phr. It is normally more preferred for the zinc oxide to be in the rubber composition at a level which is within the range of about 4 phr to about 6 phr. Stearic acid is also included in the rubber composition in an amount which is within the range of about 0.25 phr to about 5 phr. It is preferred for the stearic acid to be present in the rubber composition in an amount which is within the range of about 0.5 phr to about 4 phr. It is most preferred for the stearic acid to be present in the rubber composition at a level which is within the range of about 1 phr to about 3 phr.

The productive rubber composition is prepared by adding a curative, such as sulfur and an accelerator to the nonproductive rubber composition. Sulfur or a sulfur containing compound is typically added in an amount which is within the range of about 0.2 phr to 6 phr. It is normally preferred for sulfur to be present in the productive rubber composition in an amount which is within the range of about 0.3 phr to 4 phr. It is most preferred for sulfur to be present in the rubber composition in an amount which is within the range of 0.5 phr to 2 phr.

One or more accelerators will also be included with sulfur curatives in the productive rubber composition. Some representative examples of accelerators which can be used include: benzothiazyl disulfide, 2-mercaptobenzothiazole, N-oxydiethylene benzothiazole-2-sulfenamide, N-cyclohexyl-2-benzothiazolesulfenamide, bismuth dimethyldithiocarbamate, cadmium diethyldithiocarbamate, copper dimethyldithiocarbamate, lead dimethyldithiocarbamate, selenium diethyldithiocarbamate, selenium dimethyldithiocarbamate, tellurium diethyldithiocarbamate, zinc dimethyldithiocarbamate, zinc dibutyldithiocarbamate, tetramethylthiuram disulfide, tetraethylthiuram disulfide, dipentamethylene thiuram hexasulfide, tetramethylthiuram monosulfide, and dimethylethyl thiourea. The productive rubber composition containing sulfur curatives will typically contain from about 1 phr to about 12 phr of accelerator. It is normally preferred for the accelerators to be present in an amount which is within the range of about 2.5 phr to about 10 phr. It is most preferred for the accelerator to be utilized at a level which is within the range of about 4 phr to about 8 phr.

Productive rubber compositions can also be made with peroxide curatives. Such peroxide curatives will normally contain at least one peroxide compound, a crosslinking agent, and zinc oxide It should be noted that zinc oxide is also used in standard sulfur curative system. A wide variety of peroxide compounds can be used in such peroxide curative systems. However, acidic materials, such as peroxides based on acids or esters, should be avoided. Some representative examples of peroxide compounds which can be used include: methylethyl ketone peroxide, cyclohexanone peroxide, cumene hydroperoxide, pinane hydroperoxide, p-menthane hydroperoxide, t-butyl hydroperoxide, dicumyl peroxide, 2,5-dimethylhexane-2,5-dihydroperoxide, di-t-butyl peroxide, and the like. Dicumyl peroxide and di-t-butyl peroxide are highly preferred peroxide compounds. Some representative examples of crosslinking agents which can be used include: pentaerythritol tetraacrylate, trimethylol trimethacrylate, diallyl phthalate.

After the rubber composition is extruded into the form of a tube, the tube is shaped into the geometric form desired for the hose. Some extruding equipment can do this automatically. However, in manual operations it is necessary to bend the tube into the desired shape. This can be done on a mandrel or any other type of device which is capable of imposing the desired shape to the hose. Any scrap material generated in this shaping operation can be recycled to the extrusion step.

The shaped tube is cured in the final step at a temperature which is within the range of 130° C. to 210° C. to produce the hose. This curing step can be carried out by simply heating the shaped tube to the desired curing temperature. It is, of course, highly desirable to physically restrain the tube in the desired shape during the curing operation. The curing step is preferably carried out at a temperature which is within the range of about 140° C. to about 200° C. It is most preferred for the curing step to be conducted at a temperature which is within the range of about 170° C. to about 195° C.

In an alternative embodiment of this invention, the hose can be made by injection molding. When injection molding is used, the hose is molded directly into the desired shape. The injection molding is normally conducted at a temperature which is within the range of 130° C. to 210° C. which is sufficient to cure the rubber composition in the desired geometric shape. It is preferred to utilize a temperature within the range of 140° C. to 200° C. with temperatures within the range of 170° C. to 195° C. being most preferred.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

An EPDM alloy, having EPDM, EPDM with nylon side-chains grafted thereto and dispersed nylon, was prepared by mixing one part of nylon-6 with four parts of 1 percent maleated EPDM. This mixing was carried out in a twin screw extruder wherein the extruder temperature was held between 325° F. to 425° F. (163° C. to 218° C.) and an average residence time of from 2 to 4 minutes was maintained. The extrudate temperature was typically in the 430° F. to 490° F. 221° C. to 254° C.) range.

EXAMPLES 2-4

A rubber blend containing the polymer alloy of Example 1 and an EPDM stock was prepared in a Banbury mixer using two stages of addition. The rubber stock was one characteristic of those used in hose applications. For the purposes of comparison, rubber stocks were prepared as shown in Table I with these combinations of alloy and EPDM being mixed in the first stage with conventional amounts of carbon black, processing oil, zinc oxide and stearic acid The first stage mix was conducted for 2.5 minutes at 165° C. and 65 rpm. Next, the second stage reactants were added to make a productive blend. The second stage reactants were sulfur, accelerators and metal dithiocarbamate. The second stage was mixed for 2.0 minutes at 120° C. and 35 rpm. Test specimens from this stock were prepared by shaping according to the test requirement and curing the stock for 18 minutes at 340° F. 171° C.). Hose samples were made for the purpose of determining burst strength.

TABLE I

|  | Example 2 | Example 3 | Example 4 |
|---|---|---|---|
| EPDM Alloy | 0 | 20 | 60 |
| EPDM | 100 | 84 | 52 |
| phr nylon-6* | 0 | 4 | 12 |
| Modulus, 100% | 6.2 | 7.6 | 9.4 |
| Modulus, 300% | 13.8 | — | — |
| Tensile, MPa | 14.2 | 14.2 | 15.7 |
| Elongation, % | 325 | 285 | 183 |
| Hardness, Shore A | 82 | 83 | 85 |
| Burst Strength, psi (hose) | 107 | 121 | 165 |

*This nylon-6 is derived from the EPDM alloy

EXAMPLE 5

A rubber blend containing nylon-6 and an EPDM stock was prepared as in Examples 2-4 wherein the nylon-6 was added directly to the stock during the first stage of mixing. The remaining ingredients were added as described in the examples. After mixing was carried out, the composition was found to have large pieces of undispersed nylon-6 throughout the sample and was found to be completely unsuitable for further mixing, since the second stage mix would not provide any further dispersion of the nylon-6.

EXAMPLES 6-8

This series of examples shows that polyphenylene oxide (PPO) can be used as the thermoplastic material in making hoses by the process of this invention. In this series of experiments EPDM alloys were made as described in Example 1 and evaluated as described in Examples 2-4 with Noryl 265 PPO (supplied by General Electric) being substituted for the nylon. The results of these experiments are shown in Table II. As can be seen, good hoses were made using PPO as the thermoplastic material.

TABLE II

| PPO SERIES | 1 | 2 | 3 |
|---|---|---|---|
| EPDM Alloy | 0 | 13.3 | 40 |
| EPDM | 100 | 90.7 | 72 |
| phr PPO* | 0 | 4 | 12 |
| Modulus, 100% | 6.37 | 6.54 | 6.96 |
| Modulus, 300% | 13.7 | 13.7 | 13.7 |
| Tensile, MPa | 14.0 | 13.8 | 12.9 |
| Elongation, % | 340 | 325 | 295 |
| Hardness Shore A | 76 | 81 | 84 |
| Burst Strength psi (hose) | 93 | 112 | 148 |

EXAMPLES 9–11

In this series of experiments, polyethylene terephthalate (PET) was used as the thermoplastic material. The PET used had an intrinsic viscosity of about 62 dl/g as measured in a 60:40 (by weight) phenol:1,1,2,2-tetrachloroethane solvent system at a temperature of 30° C. The procedure used in Examples 1–4 was followed in these experiments with PET being substituted by the nylon. Table III shows that good results were attained with the polyester being used as the thermoplastic.

TABLE III

|  | 1 | 2 | 3 |
|---|---|---|---|
| EPDM Alloy | 0 | 37.5 | 75 |
| EPDM | 100 | 70 | 40 |
| phr PET* | 0 | 7.5 | 15 |
| Modulus, 100% | 5.53 | 8.25 | 9.44 |
| Modulus, 300% | 13.8 | — | — |
| Tensile, MPa | 14.1 | 14.2 | 15.2 |
| Elongation, % | 315 | 205 | 195 |

*This PET is derived from the EPDM alloy. The maleated EPDM employed was Royaltuf ™ 465 4PDM.

While certain representative embodiments and details have been shown for the purpose of illustrating the subject invention, it will be apparent to those skilled in this art that various changes and modifications can be made therein without departing from the scope of the subject invention.

What is claimed is:

1. A process for manufacturing a hose which comprises (1) extruding a rubber composition into the form of a tube, wherein the rubber composition is comprised of (a) a EPDM alloy comprised of (i) functionalized EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; (2) shaping the tube into the geometric form desired for the hose; and (3) curing the rubber composition at a temperature within the range of 130° C. to 210° C. while the tube is physically restrained in the desired shape to produce the hose; wherein the hose does not contain fabric reinforcement.

2. A process as specified in claim 1 wherein the thermoplastic is nylon and wherein the amount of nylon in the EPDM rubber having nylon side-chains is sufficient for there to be from about 2 phr to about 25 phr of nylon in the rubber composition based upon the total amount of EPDM rubber in the composition.

3. A process as specified in claim 1 wherein the rubber composition contains from about 80 phr to about 150 phr of carbon black, from about 20 phr to about 90 phr of processing oil, from about 1 phr to about 10 phr of zinc oxide, from about 0.25 phr to about 5 phr of stearic acid, from about 0.2 phr to about 6 phr of sulfur, and from about 1 phr to about 12 phr of accelerator.

4. A process as specified in claim 3 wherein the rubber composition is cured at a temperature which is within the range of about 140° C. to about 200° C.

5. A process as specified in claim 1 wherein the rubber composition is extruded into the form of a tube utilizing a spiral mandrel die.

6. A process as specified in claim 1 wherein the thermoplastic is nylon and wherein the rubber composition contains from about 3 phr to about 20 phr of nylon, from about 100 phr to about 130 phr of carbon black, from about 30 phr to about 70 phr of processing oil, from about 3 phr to about 8 phr of zinc oxide, from about 0.5 phr to about 4 phr of stearic acid, from about 0.3 phr to about 4 phr of sulfur, and from about 2.5 phr to about 10 phr of accelerators.

7. A process as specified in claim 1 wherein the thermoplastic is nylon and wherein the rubber composition contains from about 4 phr to about 12 phr of nylon, from about 110 phr to about 125 phr of carbon black, from about 40 phr to about 50 phr of processing oil, from about 4 phr to about 6 phr of zinc oxide, from about 1 phr to about 3 phr of stearic acid, from about 0.5 phr to about 2 phr of sulfur, and from about 4 phr to about 8 phr of accelerator.

8. A process as specified in claim I wherein the thermoplastic is nylon and wherein the nylon is selected from the group consisting of nylon-4, nylon-6, nylon-7, nylon-8, nylon-9, nylon-10, nylon-11, nylon-12, nylon-4,6, nylon-6,6, nylon-6,8, nylon-6,9, nylon-6,10, and nylon-6,12.

9. A process as specified in claim 7 wherein the nylon is nylon-6.

10. A process as specified in claim 9 wherein the accelerator is comprised of a combination of mercaptobenzothiazole, tetramethylthiuram disulfide, and zinc dibutyldithiocarbamate.

11. A process as specified in claim 10 wherein said rubber composition is cured at a temperature which is within the range of about 170° C. to about 195° C.

12. A process for manufacturing a hose which comprises injection molding a rubber composition into the desired geometric form for the hose at a temperature which is within the range of 130° C. to 210° C., wherein the rubber composition is comprised of (a) an EPDM alloy comprised of (i) functionalized EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; and (2) curing the rubber composition at a temperature within the range of 130° C. to 210° C. while the rubber composition is physically restrained in the desired geometric form to produce the hose; wherein the hose does not contain fabric reinforcement 13. A process as specified in claim 12 wherein the thermoplastic is nylon and wherein the amount of nylon in the EPDM rubber having nylon side-chains is sufficient for there to be from about 2 phr to about 25 phr of nylon in the rubber composition based upon the total amount of EPDM rubber in the composition.

14. A process as specified in claim 13 wherein the rubber composition contains from about 80 phr to about 150 phr of carbon black, from about 20 phr to about 90 phr of processing oil, from about 1 phr to about 10 phr of zinc oxide, from about 0.25 phr to about 5 phr of stearic acid, from about 0.2 phr to about 6 phr of sulfur, and from about 1 phr to about 12 phr of accelerator.

15. A process as specified in claim 14 wherein the nylon is selected from the group consisting of nylon-4, nylon-6, nylon-7, nylon-8, nylon-9, nylon-10, nylon-12, nylon-4,6, nylon-6,6, nylon-6,8, nylon-6,9, nylon-6,10, and nylon-6,12.

16. A process as specified in claim 12 wherein the nylon is nylon-6.

17. A process as specified in claim 16 wherein the rubber composition contains from about 3 phr to about 20 phr of nylon, from about 100 phr to about 130 phr of carbon black, from about 30 phr to about 70 phr of processing oil, from about 3 phr to about 8 phr of zinc oxide, from about 0.5 phr to about 4 phr of stearic acid, from about 0.3 phr to about 4 phr of sulfur, and from about 2.5 phr to about 10 phr of accelerators.

18. A process as specified in claim 16 wherein the rubber composition contains from about 4 phr to about 12 phr of nylon, from about 110 phr to about 125 phr of carbon black, from about 40 phr to about 50 phr of processing oil, from about 4 phr to about 6 phr of zinc oxide, from about 1 phr to about 3 phr of stearic acid, from about 0.5 phr to about 2 phr of sulfur, and from about 4 phr to about 8 phr of accelerator.

19. A process as specified in claim 1 wherein the thermoplastic is polyethylene terephthalate.

20. A process as specified in claim 1 wherein the thermoplastic is a blend of poly(phenylene oxide) and polystyrene.

21. A process as specified in claim 20 wherein the polystyrene is high impact polystyrene.

22. A process as specified in claim 1 wherein the functionalized EPDM rubber used in making the EPDM alloy was oil extended.

* * * * *